May 12, 1953  A. C. NORSWORTHY ET AL  2,637,950
CONTOURING MACHINE

Filed May 8, 1950  12 Sheets-Sheet 4

INVENTORS
Arthur C. Norsworthy
William B. Mayo
Marion B. Seyffert
BY George L. Meidinger
George W. Sievers
ATTORNEY INVENTORS
Arthur C. Norsworthy
William B. Mayo
Marion B. Seuffert
George L. Meidinger
BY George W. Seevers
ATTORNEY

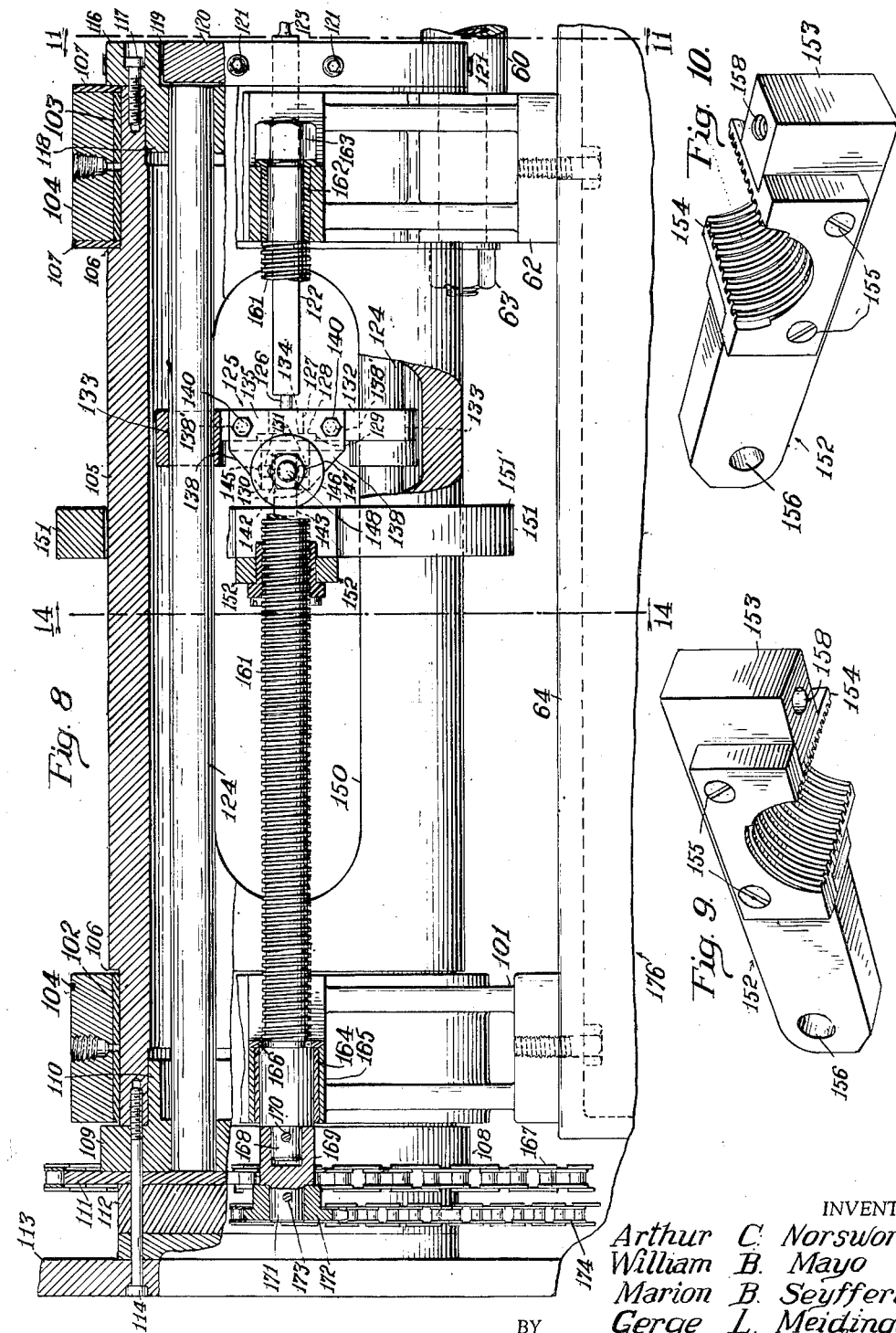

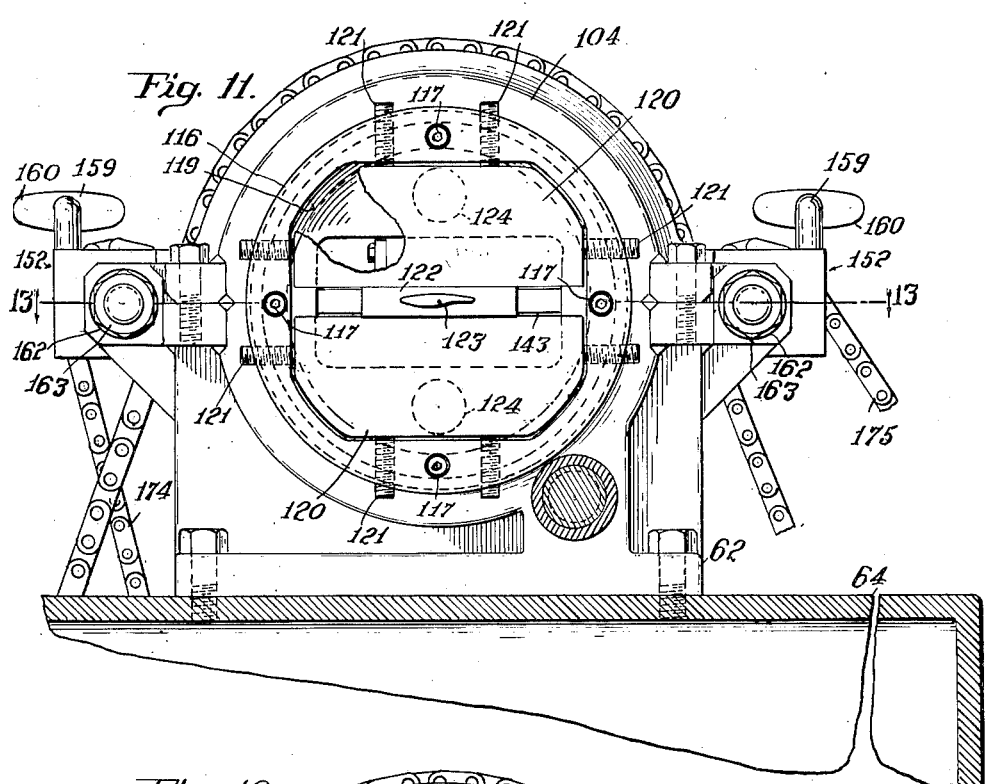
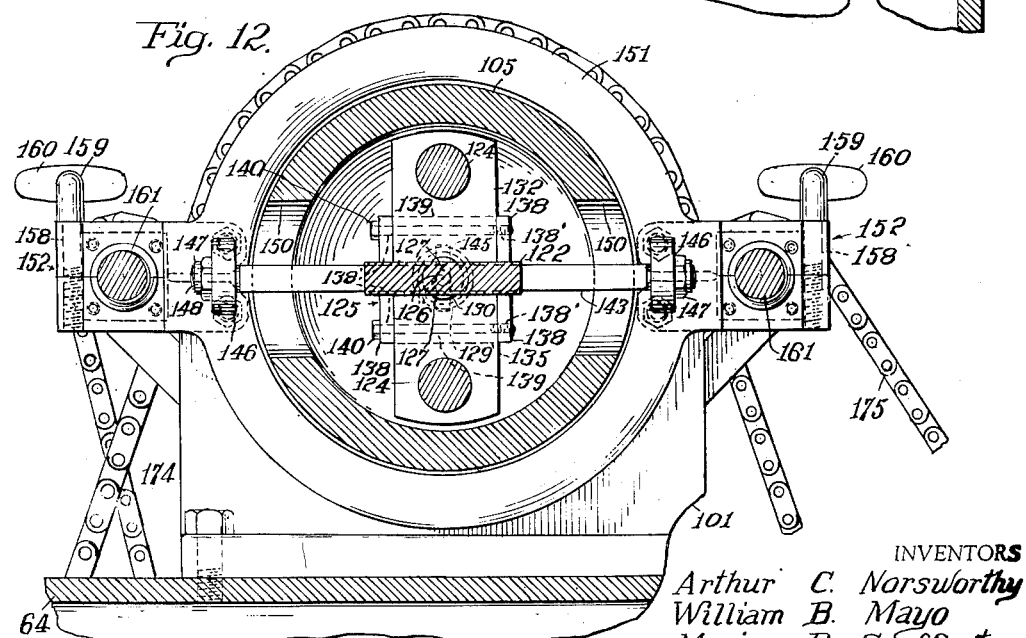

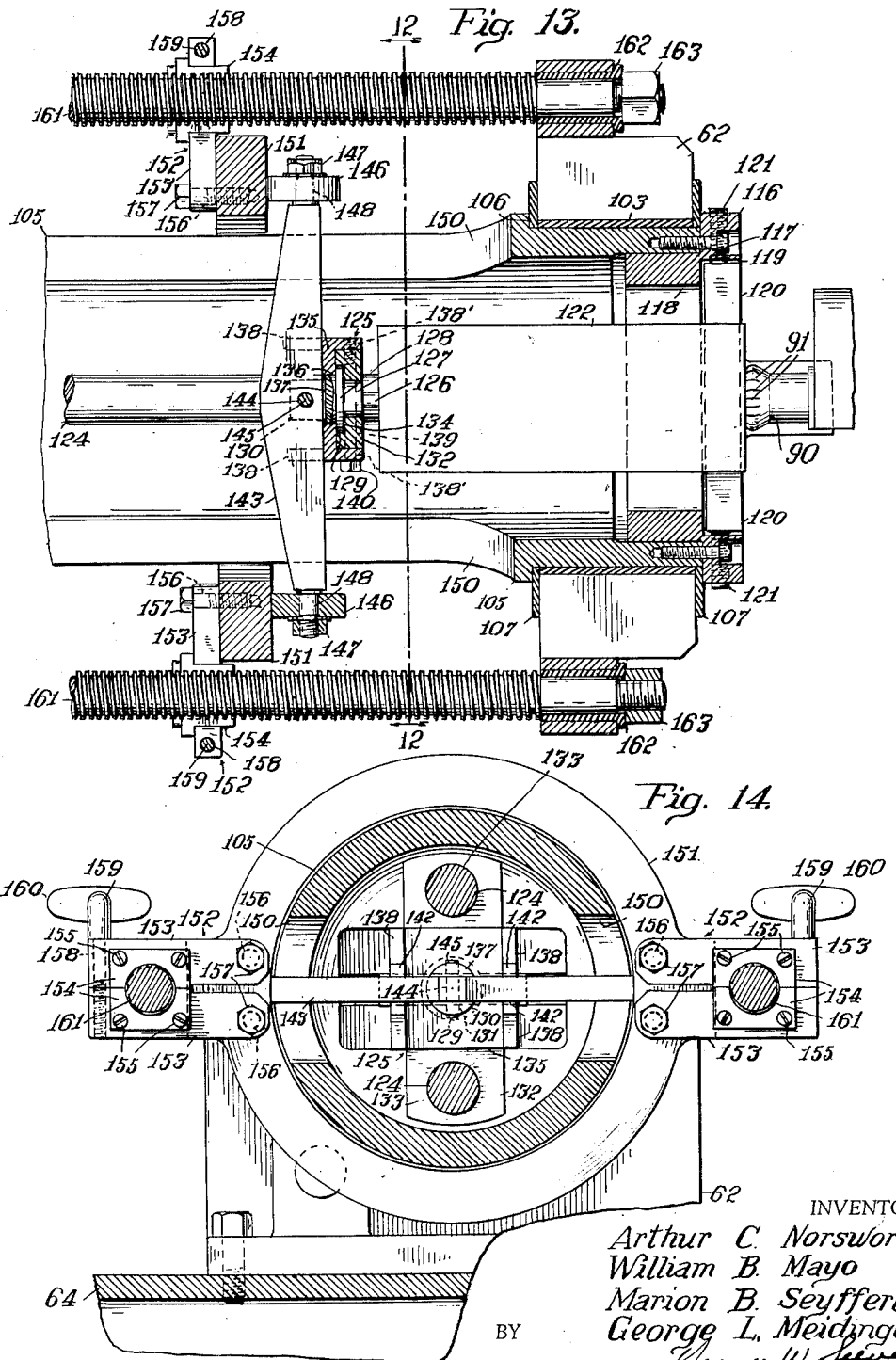

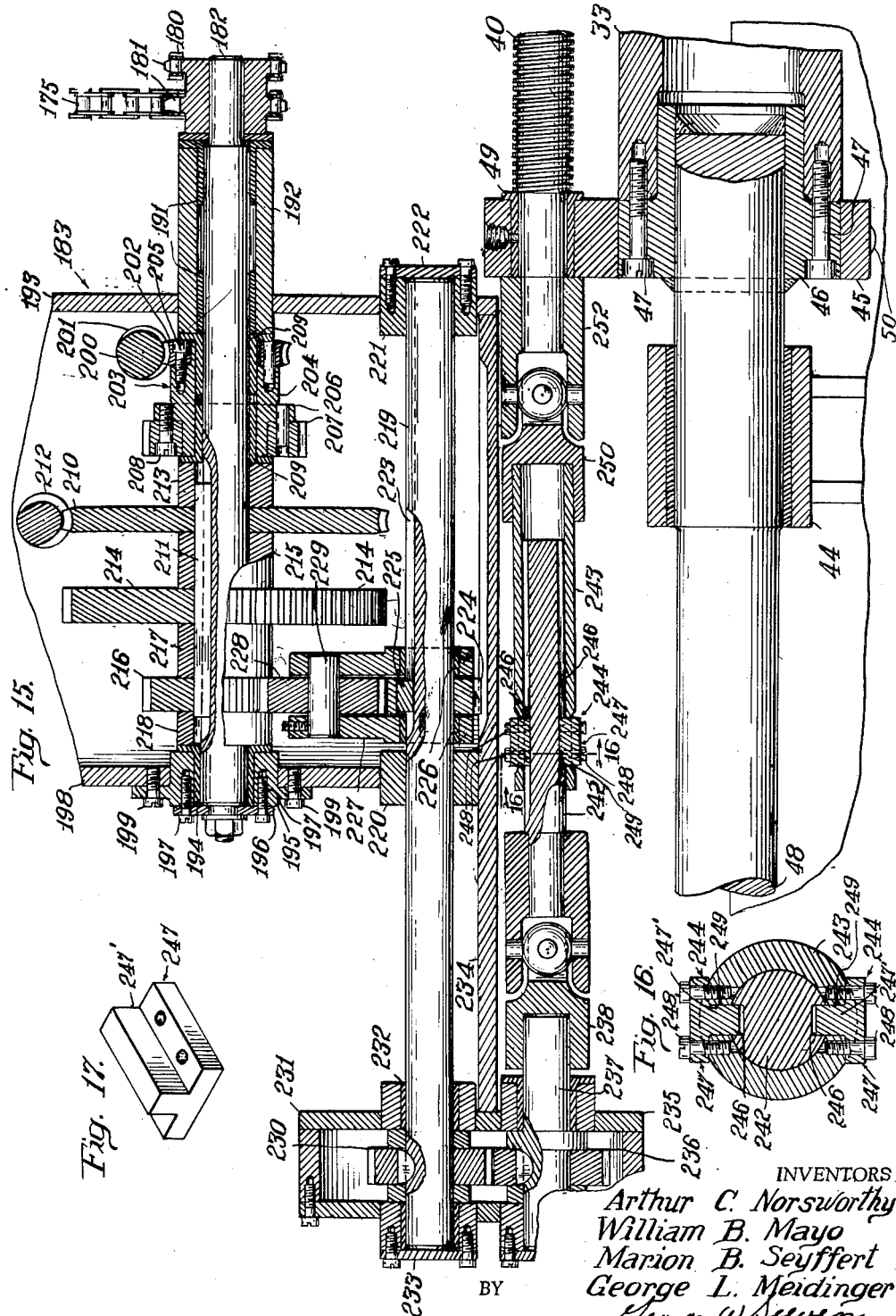

May 12, 1953 A. C. NORSWORTHY ET AL 2,637,950
CONTOURING MACHINE
Filed May 8, 1950 12 Sheets-Sheet 10
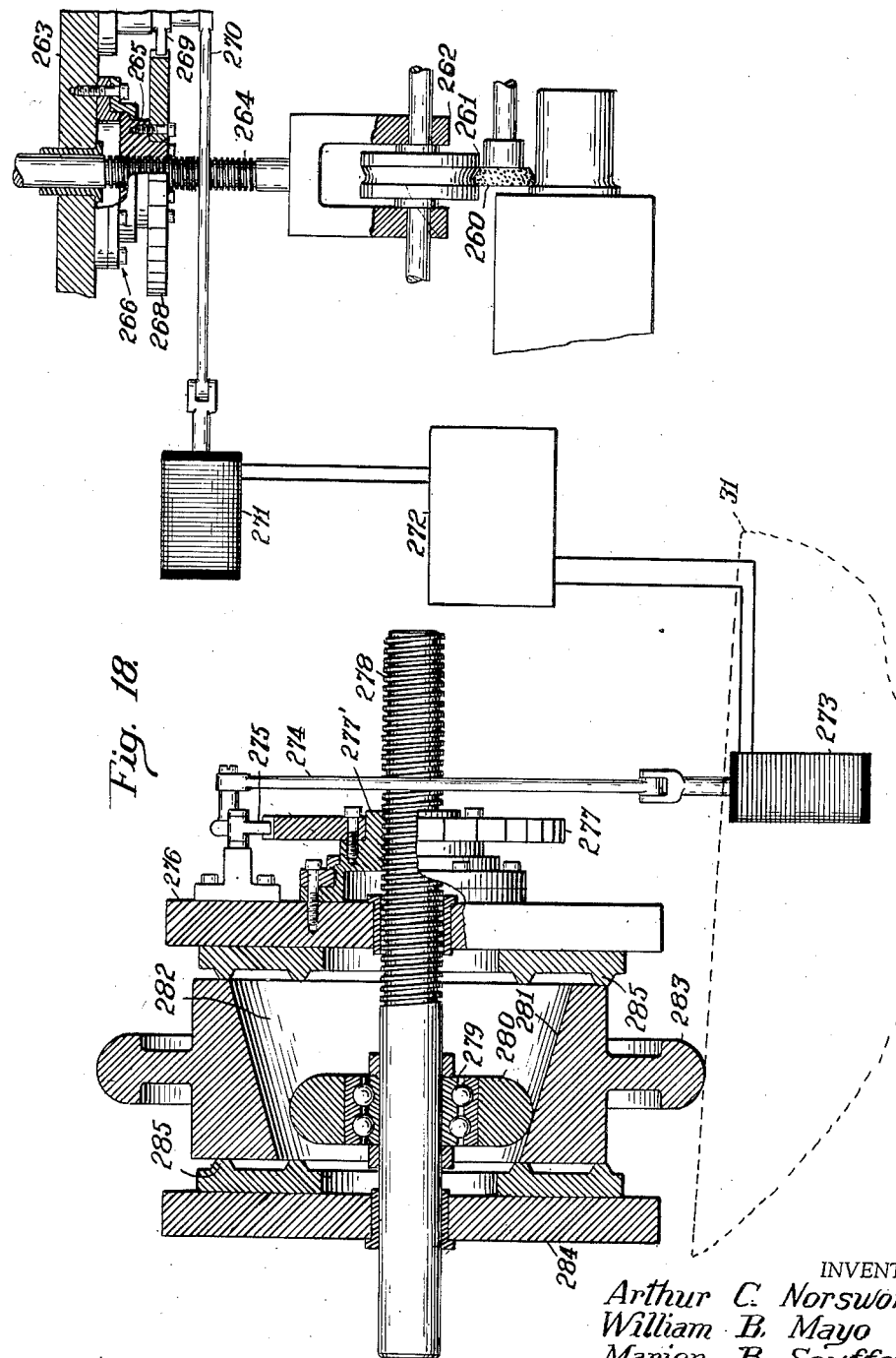
INVENTORS
Arthur C. Norsworthy
William B. Mayo
Marion B. Seyffert
George L. Mejdinger
BY George W. Lewen
ATTORNEY

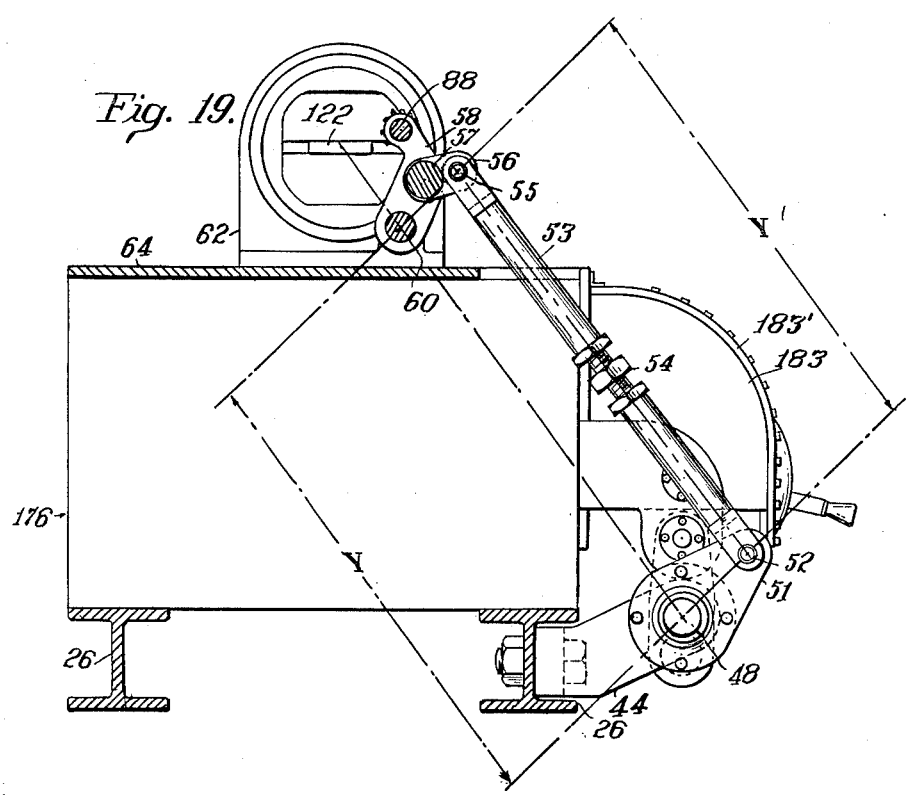

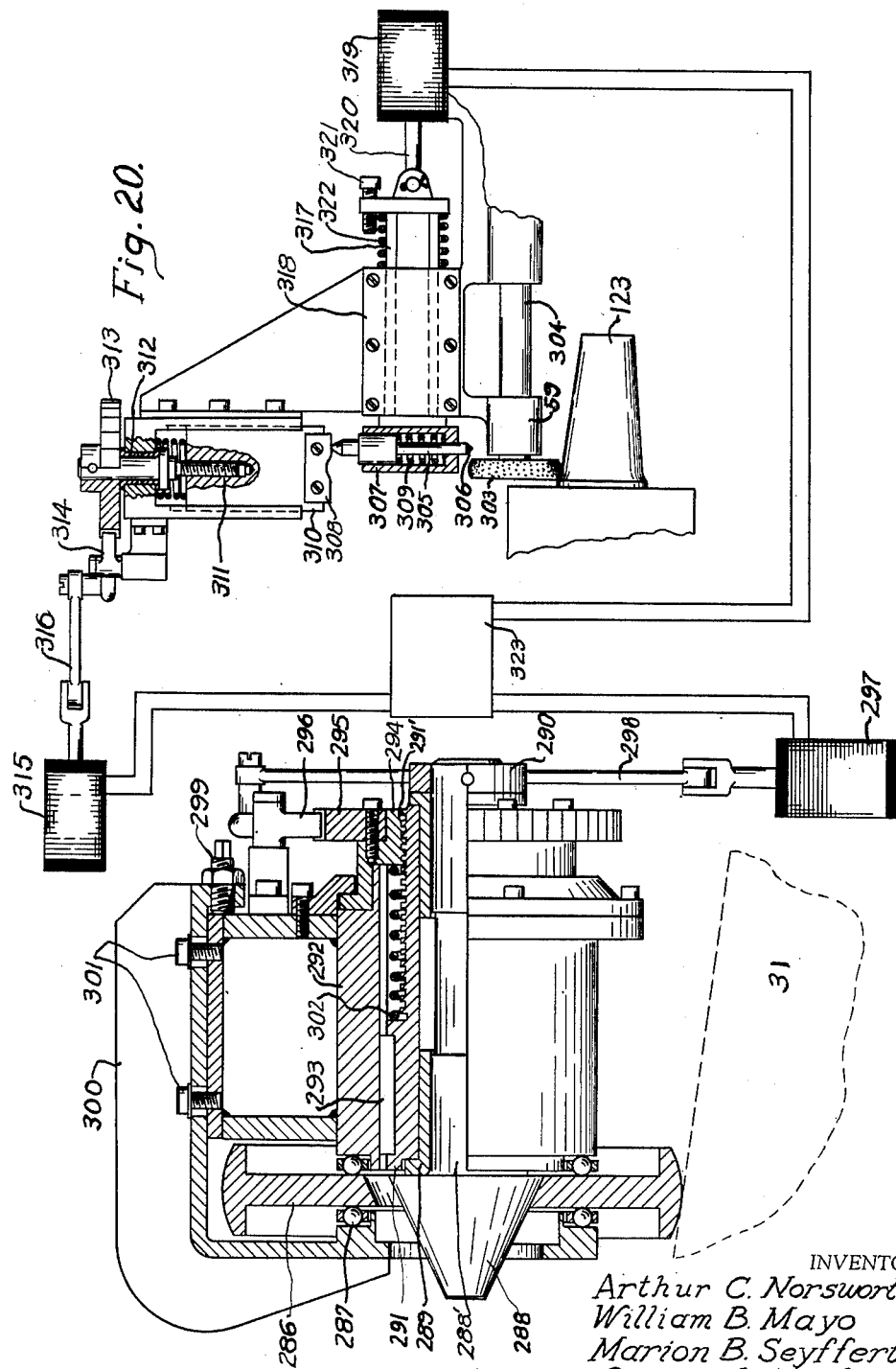

Patented May 12, 1953

2,637,950

UNITED STATES PATENT OFFICE 2,637,950

CONTOURING MACHINE

Arthur C. Norsworthy, Phoebus, George L. Meidinger, Hampton, William B. Mayo, Hilton Village, and Marion B. Seyffert, Hampton, Va., assignors to Technical Service Corporation, Newport News, Va., a corporation of Virginia Application May 8, 1950, Serial No. 160,712

17 Claims. (Cl. 51—101)

This invention relates to a new and improved machine for producing irregularly shaped articles; and more particularly to a machine for contour cutting and/or grinding of three dimensional air foil blades.

One object of this invention is to provide a machine that will cut and/or grind air foil blades from blank stock that are suitable for use in gas turbines, steam turbines, compressors, etc.

A further object of this invention is to provide a machine that will cut and grind blades of any shape or contour from a pattern, and which will finish these blades to within a very small tolerance.

A further object of this invention is to provide a machine that will produce a blade which is made from a pattern and which may have various ratios of size between the pattern and blade.

Another object of this invention is to provide a machine which may be used to cut or mill blank stock into a roughly finished blade and then complete the blade by grinding, by simply changing the milling head to a grinding head.

A yet further object of this invention is to provide a machine that lends itself readily to adaptation of the cutting of a plurality of blades from one pattern equally as well as the cutting of a single blade.

Another object of this invention is to provide a machine for cutting air foil blades in which there is provided a rotating barrel for holding the blank stock and which barrel is centered upon the same axis as the pattern and is directly driven with the pattern.

Another object of this invention is to provide a blade cutting and/or grinding machine which has a pushing mechanism for moving the work piece through the jaws of a chuck located in the barrel, as the barrel and work piece or blank stock rotate; said pushing mechanism being located primarily within the barrel and operating directly against the blank stock along a line concident with the center line of the pattern; also a mechanism which can easily and quickly be opened and disengaged for resetting of the same to receive a new blank stock after the blade is completed.

A yet further object of this invention is to provide a contouring machine which has a flywheel directly mounted upon the drive shaft of the cutter head.

Other objects and advantages will become apparent as the discussion proceeds and is considered in connection with the accompanying drawings, in which:

Fig. 8 is a longitudinal section, partially in elevation, of the barrel assembly;

Figs. 9 and 10 are perspective views of the upper and lower threaded jaws of the blank stock feed mechanism;

Fig. 11 is an end plan taken along the line 11—11 of Fig. 8;

Fig. 12 is a section taken along the line 12—12 of Fig. 13;

Fig. 13 is a section taken along the line 13—13 of Fig. 11;

Fig. 14 is a section taken along the line 14—14 of Fig. 8;

Fig. 15 is a side elevation, taken on line 15—15 of Fig. 4, partially in section, showing in detail the universal joints of the follower arm feed screw, the barrel feed screws and the gear box for driving;

Fig. 16 is a section taken along the line 16—16 of Fig. 15, showing in detail the sliding splined coupling;

Fig. 17 is a perspective, showing in detail the key of the coupling shown in Fig. 16;

Fig. 18 is a longitudinal sectional view, including an electronic diagram, of a take-up compensator control, follower and adjustment for a grinding wheel used on the machine when converted to a grinder;

Fig. 19 is a sectional view taken along the line 19—19 of Fig. 1; and

Fig. 20 is a view of another form of compensating follower wheel, including also an electronic diagram for the controls and adjustment for a grinding wheel used on the machine when converted to a grinder.

Figure 1:
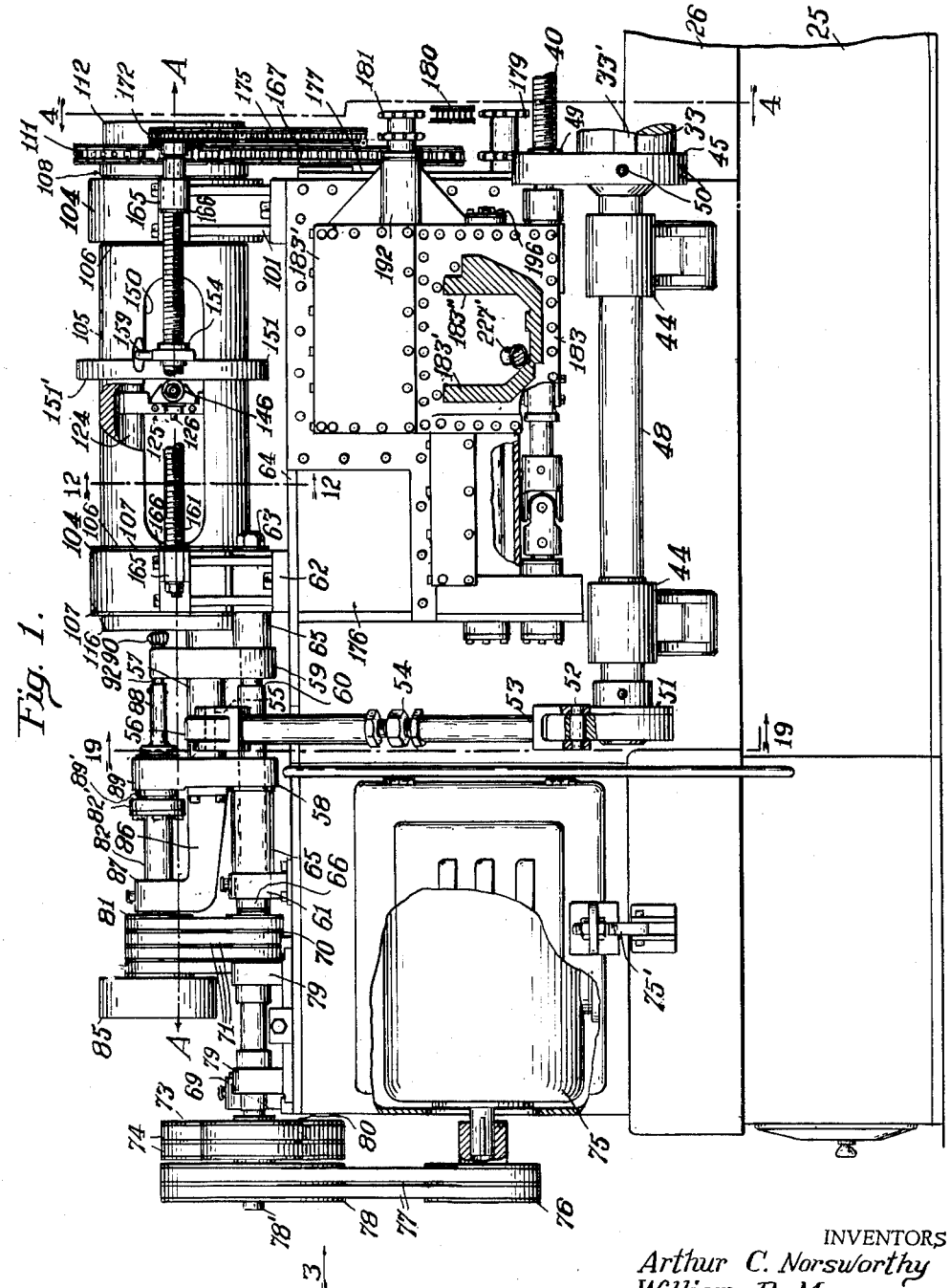
Figs. 1 and 2 are rear side elevation views with some parts broken away and in section, continued onto two separate sheets, of the entire machine.
Figure 2:
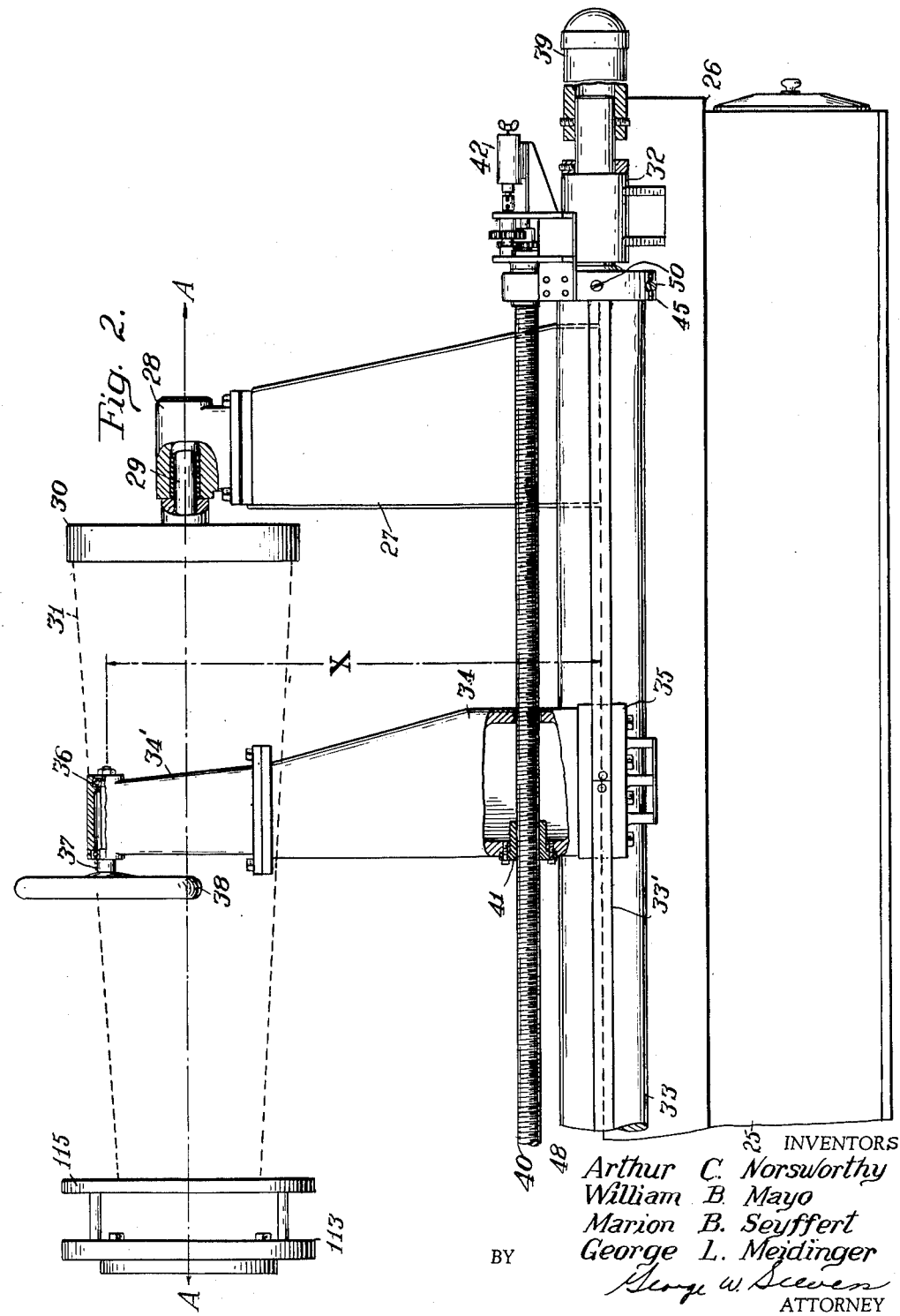

Turning now to a detailed description of the drawings, the numeral 25 designates a sub-base upon which a base 26 is mounted. Upon one end of the base 26, as shown in Fig. 2, is mounted an upright standard 27 having a suitable bearing 28 carried upon the upper end thereof. A shaft 29 rotates within the bearing 28, and mounted upon one end thereof is a plate 30, which in turn rotatably supports a pattern or template 31. The template 31 is detachably affixed to the plate 30, preferably by bolts or clamps (not shown), in order to permit changing the template for different forms of blades. The template 31 rotates about an axis A—A of Figs. 1 and 2.

A suitable bearing 32 is likewise mounted upon the base 26. Rotatably carried through the bearing 32 is a torque shaft 33, which is provided with a pair of keys 33' extending longitudinally on each thereof, as shown in both Figs. 1 and 2. Slidably carried upon the torque shaft 33 is a follower arm 34.

The follower arm 34 is keyed to the torque shaft 33 by means of a clamp 35 which slidably fits around the keys 33'. As shown in Fig. 2, the follower arm 34 preferably is provided with an interchangeable head 34'. The interchangeable heads vary in length and are for use when different types of work are in the machine. By using heads 34' of different lengths the effective overall length of the follower arm 34 may be changed as desired.

Mounted upon the upright end of the follower arm 34 is a bearing 36 into which a shaft 37 of a follower wheel 38 freely rotates. The follower wheel 38 rotatably bears against the template 31 during the operation of the machine. As will be seen from a study of Fig. 2, the follower arm 34 is moved about an axis which is the center of torque shaft 33, as directed by the contour of the template 31 as it rotates. This motion in turn is translated to the torque shaft 33.

An arm 39 is pivotally connected to the end of the torque shaft 33 and lies outside of the bearing 32. The arm 39 is adapted to receive a sliding counterweight (not shown) which may be used, if desired, to hold the follower wheel 38 against the template 31.

A threaded drive screw 40 extends through the follower arm 34, as shown in Fig. 2, and threadably engages a nut 41 provided therein. Rotation of the threaded drive screw 40 moves the follower arm 34 longitudinally the length of the shaft 33, which in turn moves the follower wheel longitudinally against the template 31. This particular function of the machine will be explained more in detail in connection with the explanation of the entire machine.

The torque shaft 33 is supported at the end opposite the bearing 32 by means of a pair of bearings 44, each mounted upon the base 26. In between the bearings 44 and the bearing 32 is a pair of support members 45 securely mounted upon the torque shaft 33 adjacent either end thereof. Each of the support members 45 is provided with a connecting collar 46, shown in detail in Fig. 15, held to the torque shaft 33 by means of stud bolts 47. Securely attached to the connecting collar 46 is a sub-extension 48 of the torque shaft 33, which is rotatably mounted in bearings 44, as shown in Figs. 1 and 15. The threaded drive screw 40 is rotatably supported at each end in each of the members 45 by means of a friction bearing 49, and the support is securely but adjustably fastened to the torque shaft 33 by means of stud bolts 50.

If desired, a conventional rotation counter 42 may be connected to the end of the threaded feed screw 40 and mounted on the support member 45 adjacent the bearing 32, as shown in Fig. 2.

Upon one end of the sub-extension 48 of the torque shaft 33 is a crank arm 51, as shown in Figs. 1 and 19. Suitably secured to the crank arm 51 by means of a crank pin 52 is a connecting rod 53, which is provided, intermediate its ends, with an adjusting means 54, here shown to be conventional adjustable lock nut arrangement.

Figures 6, 7:
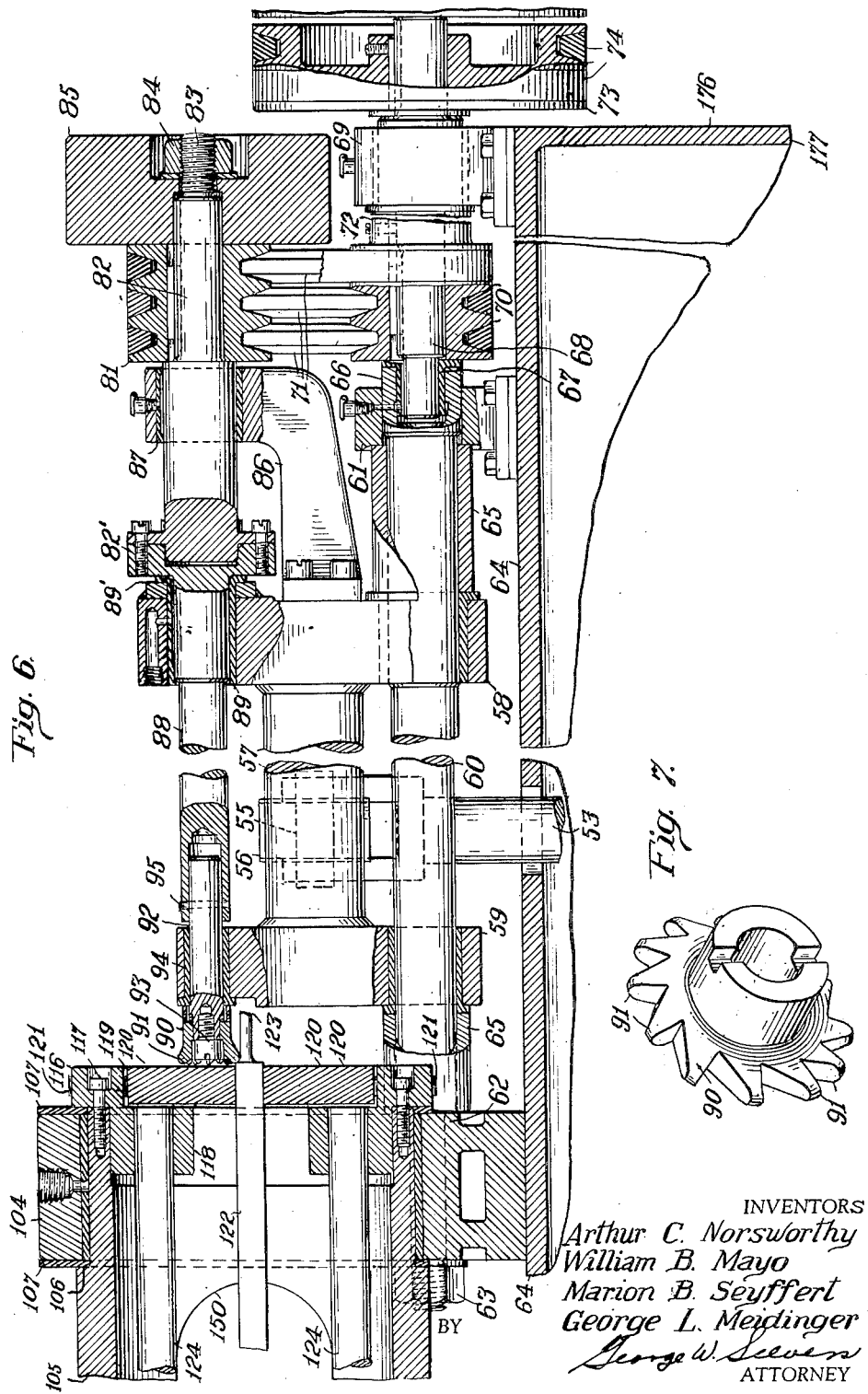
Fig. 6 is a front side elevation, partially in section, of the cutter head assembly, showing a portion of the rotating barrel, jaws of the chuck, cutter head and flywheel.
Fig. 7 is a perspective view of one type of cutter.

The other end of the connecting rod 53 is connected to a second crank pin 55, best shown in Figs. 1, 6 and 19. The crank pin 55 is carried upon a lug or bracket 56 in the form of a projecting arm formed integral with or attached to a connecting member 57. The connecting member 57 is attached at both ends to pivoted bearing support plates 58 and 59.

The bearing support plates 58 and 59 are pivotally mounted upon a shaft 60, as best shown in Fig. 6, which in turn is supported upon a mounting 61 and housing 62. The shaft 60 is secured to the housing 62 by means of a nut 63 threaded thereon. The mounting 61 and housing 62 are carried upon a supporting plate 64. Collars 65 carried upon the shaft 60 retain the plates 58 and 59 in spaced relation from the mounting 61. The shaft 60 extends through the mounting 61 and is provided with an enlarged extension 66, as shown in Fig. 6. The enlarged extension 66 has provided therein a friction bearing 67 which rotatably carries a shaft 68.

The shaft 68 extends through and is supported intermediate its ends by a second bearing 69. Keyed upon, or otherwise securely fastened to the shaft 68, intermediate the mounting 61 and bearing 69 is a V-belt pulley or sheave 70. While the sheave 70 is shown here constructed to receive three V-belts 71, it is to be understood that any number of belts may be provided suitable for the type of load. A spacer 72 is provided on the shaft 68 and retains the sheave 70 in its axial position from the bearing 69.

Upon the extreme end of the shaft 68, extending through the bearing 69, is mounted a second V-belt pulley or sheave 73, which is here shown as receiving two V-belts 74, but again it is to be understood that such number of belts may be utilized as desired. The pulley 73 may be locked to the shaft 68 in any way desired, but is here shown as locked by means of a suitable key and set screw.

An electric motor 75 is suitably mounted upon the base 26 and carries a V-belt pulley or sheave 76, which drives V-belts 77. The bolt 75' adjustably ties the motor 75 to the base 26. The belts 77 drive a V-belt pulley 78 mounted upon a shaft 78'. The shaft 78' is rotatably mounted upon a pair of bearings 79. Another V-belt pulley 80 is also mounted on the shaft 78' and together with the pulley 78 is keyed thereto. The V-belts 74 are driven by the pulley 80, and the drive assembly just described provides a speed reduction drive between the motor 75 and the shaft 68.

The V-belts 71 drive a V-belt pulley or sheave 81, which in turn is securely affixed to a shaft 82. The shaft 82 is provided on one end with threads 83, as shown in Fig. 6. Held to the shaft 82 by means of a nut 84 is a flywheel 85. Intermediate the ends of the shaft 82 there is provided a bearing hanger or support 86 mounted upon the pivoted bearing plate 58. Provided in the end of the hanger 86 is a friction bearing 87, which rotatably supports the shaft 82.

A detachable coupling 82' attaches the shaft 82 to a cutter head drive shaft 88. The cutter head drive shaft 88 adjacent the end nearest the coupling 82" is supported by means of a suitable bearing 89, here shown as a friction bearing, provided in the bearing support plate 58. A thrust bearing spacer 89' may, if desired, be provided on the bearing 89 to bear against the coupling 82'.

A cutter 90 provided with milling teeth 91, as shown in detail in Fig. 7, is attached to a shaft 92 by means of a stud bolt 93, or the like. The shaft 92 is rotatably mounted in a friction bearing 94, which in turn is suitably mounted in the bearing support plate 59. The shaft 92 is detachably connected to the cutter shaft 88 by means of a pin 95.

It will be seen from the foregoing detailed description that the cutter 90 will be rotatably driven from the V-belt pulley or sheave 73 but at the same time is permitted to swing freely about an axis, the center of which is coincident with the center of shaft 60; and that shaft 60, pivotally supporting plates 58 and 59, which in turn are attached to connecting rod 53, allows the cutter 90, while it is rotating about its own axis, to swing or pivot about the axis of the shaft 60. In other words, when the follower wheel 38 bearing against the template 31 causes the follower arm 34 to pivot the torque shaft 33, the crank arm 51 actuating the connecting rod 53 causes the cutter 90 to pivot about the axis of the shaft 60.

By way of illustration, Fig. 19 has been provided with schematic lines representing a parallelogram. A line is drawn through the center line of the machine A—A, the center of shaft 60, and thence through the center of shaft 48 which is also a continuation of the center of shaft 33. The second line of the parallelogram is the center of the link 53 with the line passing through the center of pins 52 and 55. Regardless of the operation of the machine, these lines are always parallel. A line drawn through the center of shaft 60 and pin 55 is always parallel to a line drawn through the center of shaft 48 and pin 52. The distance between the center of shafts 60 and 48 is represented by Y, and between the center of pins 56 and 52 by Y'. Y and Y' may or may not be equal, but remain constant at all times.

There is a direct ratio between the distance between the center of the shafts 60 and 33 and the effective length of the follower arm 34 from the center of bearing 36 and the center of shaft 33. In the drawings this ratio is 6:1. Schematically indicated in Fig. 2, the line X, representing the distance between the centers of shafts 33 and 37, is equal to six times the distance between the centers of shafts 60 and 38. If different sized support plates 58 and 59 are used, it is necessary to change to head 34' of the follower arm 34. While a ratio of 6:1 is here shown, it is to be understood that other ratios may be used for different types of work.

A second housing 101, identical to the housing 62, is also mounted upon the support plate 64. Both of the housings 62 and 101 are provided with friction bearings 102 and 103, respectively. The bearings 102 and 103 may be split, as best shown in Fig. 8. Rotatably mounted within the bearings 102 and 103, and supported adjacent its extremities thereby, is a barrel 105. The barrel 105 is provided with journals 106 which receive the bearings 102 and 103. Thrust bearing plates 107 are provided, as shown in Figs. 6 and 8.

The barrel 105, as shown, is tubular and preferably should be fitted to the friction bearings 102 and 103 to the absolute minimum clearance.

A drive assembly, designated generally by the numeral 108, and shown in detail in Fig. 8, is provided on one end of the barrel 105. The drive assembly 108 consists of an annular plate 109 having a shoulder 110 which fits into the barrel in friction contact with the bore thereof. A sprocket wheel 111 is mounted against the plate 109 and is held thereagainst between plate 109 and a second plate 112. A template mounting plate 113 is positioned adjacent the plate 112. Stud bolts 114 pass through the annular plate 109, the sprocket wheel 111, plate 112 and mounting plate 113 of drive assembly 108, and are threaded into the barrel 105. When the stud bolts 114 are tightened, the whole assembly is securely affixed to and rotates with the barrel 105. Securely mounted upon the template mounting plate 113 there may, if desired, be provided a template support 115. The template 31, as best shown in Fig. 2, is secured to the support 115 in any desired manner, as by bolts, screws or the like (not shown). The support 115 is attached to the template mounting plate 113, as by bolts, screws, or the like.

Turning now to a detailed description of the structure of the barrel, attention is directed to Figs. 1, 6 and 8 to 14 inclusive. A chuck holding plate 116 is secured to the end of the barrel 105 opposite the drive assembly 108 by means of stud bolts 117 spaced circumferentially thereabout. A shoulder 118, provided on the plate 116 as shown in Fig. 6, is in friction engagement within the inner circumference of the barrel 105. The chuck holding plate 116 is provided with an annular recess 119 into which are provided a pair of chuck jaws 120. The chuck jaws 120, as best shown in Figs. 6, 8 and 11, are held in adjustable position in the recess 119 by means of four sets of "Allen" set screws 121. The chuck jaws 120 may be of any desired type but preferably should be of complementary inner faces and receive therebetween in slidable engagement a blank stock or work piece 122. As will be seen from a study of Fig. 6, the chuck jaws 120 are positioned adjacent to, but spaced apart very slightly from, the cutter 90, and the finished blade 123 is milled, cut, or ground, at this point.

A pair of rods 124 extend the length of the inside barrel 105 and are securely supported at either of their ends within the plates 109 and 116, as best shown in Fig. 8.

The rods 124 preferably should be highly polished and are adapted to slidably receive thereon a blank stock pusher assembly 125.

The blank stock pusher assembly 125 consists of a pin 126 which abuts against the end of the blank stock 122. Pin 126 is formed integral with and extends from a reduced shoulder 127, provided upon the end of a bearing member 128. The bearing member 128 is provided with a flange 129, as best shown in Fig. 13. A pair of arms 130 having a pair of aligned holes 131 is provided on the end of member 128 opposite the pin 126, as shown.

The bearing member 128 is slidably fitted into a cross piece 132, with the reduced shoulder 127 extending therethrough. At both ends of the cross piece 132 there are provided a pair of holes 133 which slidably receive each one of the pair of rods 124. The flange 129 is inserted into a recess 134 formed intermediate the ends of the cross piece 132, as shown in Fig. 13.

A second retaining member 135, in the form of an "I," is provided with a hole 136 which receives a second collar 137 formed on the bearing member 128 adjacent the shoulder 129. The second retaining member 135 is provided with a pair of flanges 138 extending at right angles to the main portion of the retaining member 135. Aligned holes 138' formed in the flanges 138 coincide with complementary holes 139 formed in the cross piece 132 and the flanges 138 embrace the cross piece, as shown in Fig. 13. The retaining member 135 is attached to the cross piece 132 by means of bolts 140. The retaining member 135 serves to hold the flange 129, and consequently the bearing 128, in the recess 134 of the cross piece 132. The flanges 138, on the opposite side of the retaining member 135, are provided with a pair of aligned rectangular recesses 142.

A pushing bar 143 is located in the aligned recesses 142, as shown in Fig. 14, and is provided with a hole 144 which is aligned with the holes 131 of the bearing 128 and is pivotally connected to the member 128 by means of a pin 145.

On each end of the pusher bar 143 there is provided a rotatable wheel 146. The wheels 146 are retained on the pusher bar 143 by means of nuts 147. It is to be here understood that while the wheels 146 are shown to bear frictionally on shafts 148, integrally formed on the pusher bar 143, any form of bearing may be used; and, if desired, a roller bearing assembly may be substituted for the friction bearing.

The barrel 105 is provided with a pair of elongated openings 150 spaced 180° apart and extending substantially the length of the barrel between the plates 109 and 116, as shown in Figs. 8, 12, 13 and 14. The pushing bar 143, as best shown in Figs. 12 and 13, extends through the openings 150 in the barrel 105, and the wheels 146, as shown in Fig. 13, are located externally of the barrel.

Surrounding the barrel 105 is an annular ring 151, which is spaced apart from the barrel 105, as best shown in Figs. 8, 12, 13 and 14. Pivotally mounted upon the annular ring 151 and disposed 180° apart is a pair of identical split clamps 152. The clamps 152, shown in detail in Figs. 9 and 10, consist of a pair of identical jaws 153, each provided with a segment of a threaded nut 154, which are held in jaw 153 by means of screws 155. Each of the jaws 153 is provided at one end thereof with a hole 156 through which a stud bolt 157 passes and threads into the ring 151 to pivotally connect each jaw 153 of the clamps 152 to the annular ring 151. Through each of the jaws 153, opposite the hole 156, there is provided a hole 158, which extends therethrough for the purpose of receiving a bolt 159, which may be provided with wings 160, if desired. The bolt 159 may be provided with a nut (not shown) or one of the holes 158 may be threaded, as shown in Figs. 10 and 14, to receive the complementary threads of the bolt 159.

The jaws 153, when closed, embrace a pair of threaded feed screws 161 located 180° apart, as best shown in Fig. 13. It is to be here observed that this particular construction of the clamp and threaded drive screw is to permit the clamps 152 to be located in threaded engagement with the screws 161 when the machine is in operation, and to be quickly disengaged therefrom by opening the jaws 153 when new work is placed in the barrel, and the annular ring 151, together with the pushing bar 143 and its assembly, is returned to the end of the barrel away from the cutter 90.

The threaded feed screws 161 are rotatably supported in friction bearings 162 mounted in suitable brackets, or the like, formed integral with or attached to the cases 104 carried on the mounting 62. Nuts 163 are provided on the ends of the threaded drive screws, as shown in Fig. 13, to retain these screws in place.

The opposite ends of the threaded drive screws 161 are rotatably supported within bushings 164 suitably mounted in brackets or the like 165, formed integral with or otherwise rigidly attached to the case 104, supported by the mounting 101. A thrust bearing plate 166 is provided between the threads on rods 161 and the bearings 164.

Briefly, the operation of the barrel is described as follows:

During the operation of the machine, the barrel is rotated in the bearings 102 and 103 by means of a driving chain 167 carried upon the sprocket wheel 111. The particular drive means for the chain 167 will be described in detail later in conjunction with the operation of another section of this machine. It is to be here emphasized that the barrel 105 rotates about the same axis with the template 31.

While the barrel is rotating about its axis, the rods 124 will carry the blank stock pusher assembly 125 with the barrel, and this in turn will rotate the pushing bar 143. This movement in turn causes the wheels 146 to roll about the face 151' of the annular ring 151. The threaded feed screws 161 are rotated by means of a driving mechanism which will be described in detail later. As the threaded drive screws 161 turn, the clamps 152 cause the annular ring 151 to move towards the work piece 122, and to push against the wheels 146 as they rotate with the barrel; this forces the pin member 126 into a hole (not shown) provided in one end of the work piece 122, which in turn is caused to slide through the jaws 120 at the same time the barrel rotates the work piece. This action progressively addresses the work piece 122 against the cutter 90.

Each of the threaded feed screws 161 is provided with a reduced section 168 on the end thereof, adjacent the friction bearing 164. An annular collar or coupling 169 is attached to the reduced section 168 of each of the feed screws 161 by means of a pin 170. The collar 169 is also provided with a reduced section 171 which in turn is connected to a small sprocket wheel 172 by means of a pin 173. Each sprocket wheel 172 is provided with a drive chain designated 174 and 175, respectively, as shown in Fig. 4.

Figure 4:
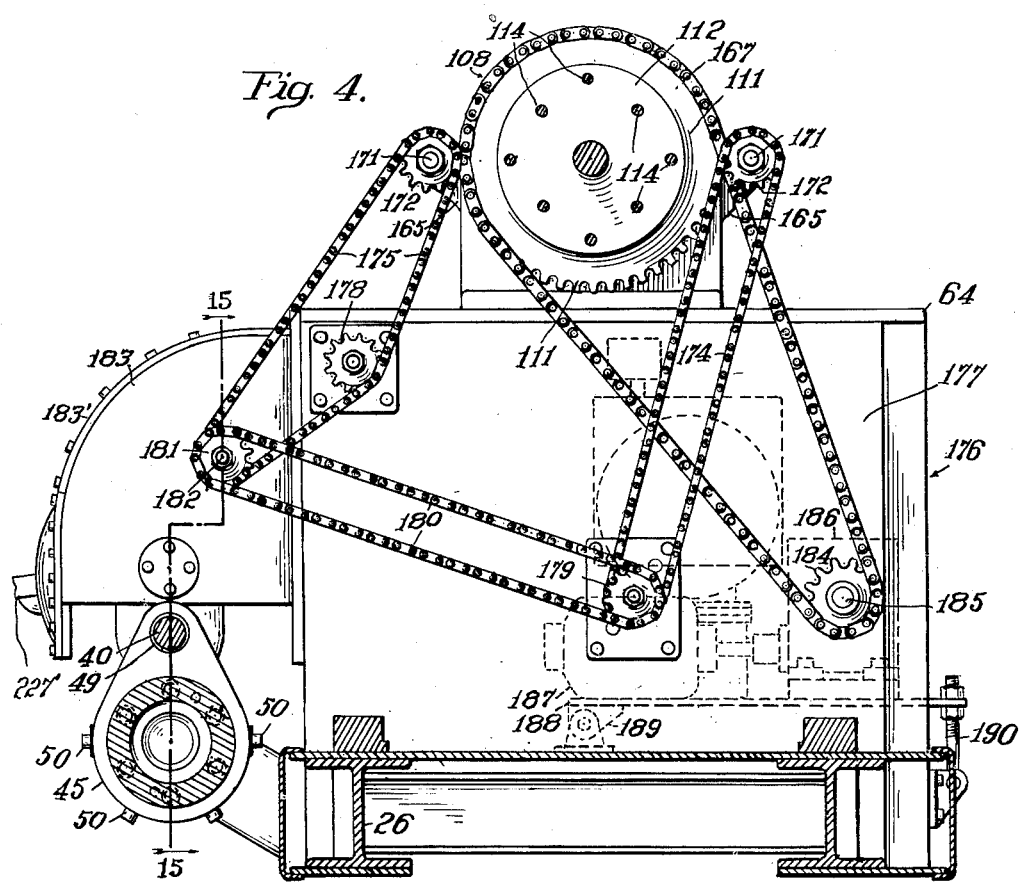
Fig. 4 is a sectional view taken along the line 4—4 of Fig. 1.
Figure 5:
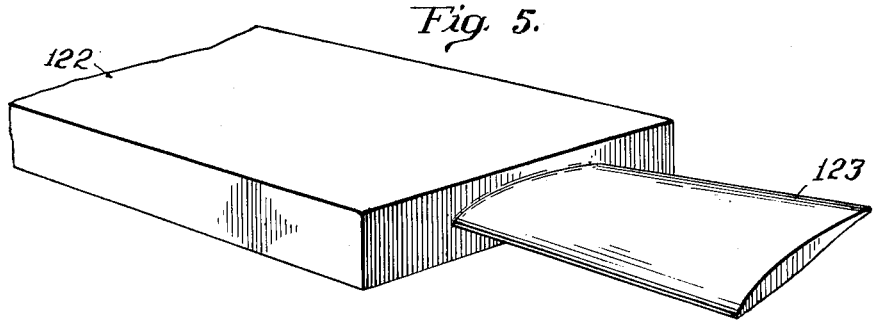
Fig. 5 is a perspective view of a partially finished air foil blade still attached to the blank stock.

Attention is now directed to Fig. 4 for a detailed explanation of the driving mechanism operating chains 167, 174 and 175. The supporting plate 64 serves as a cover for a motor and gear box housing, designated generally by the numeral 176. The housing 176 is provided with an end plate 177. An idler sprocket 178 is suitably bolted to the end plate 177, as shown, and preferably is provided with a suitable adjusting means for taking up the slack in driving chain 175.

Also located upon the end plate 177 is a dual idler sprocket 179 which is suitably mounted on the end plate 177 by means of bolts or the like. One of the dual sprockets 179 receives drive chain 174, and the other sprocket receives a drive chain 180. It might be well to explain here that the purpose of the dual idler sprocket 179 is to enable the driving of chain 174, connected to drive feed screw 161, around the drive assembly designated generally by the numeral 108.

Drive chains 175 and 180 are connected to dual driving sprockets 181, which are securely mounted upon a shaft 182 carried upon a gear box housing 183.

The drive chain 167 operating the template and barrel is driven by means of a sprocket 184, connected to a drive shaft 185 which may be operated from suitable gear box 186. However, it is preferred to use a hydraulic speed reduction gear box, of which there are many on the market and the details of which do not form a part of this invention. The gear box 186 receives its drive from an electric motor or the like, 187. While the motor 187 is shown more outlined here to be an electric motor, it is to be understood that this motor may be of any type desired suitable for the load and speeds required.

The gear box 186 and motor 187 are mounted upon a plate 188, preferably hinged as at 189 and held down by means of a clamp 190. This arrangement is preferable in order to permit assembly of this portion of the machine and because the plate 188 is hinged at 189, correct tension can easily be applied to chain 167.

The gear box 183 encases a high-low speed-reducer mechanism, shown in detail in Figs. 1 and 15. The drive shaft 182 is suitably mounted in the housing 183 by means of suitable friction bearing 191 mounted in a bearing support 192 carried upon a housing plate 193. The other end of the drive shaft 182 is mounted in a friction bearing 194 suitably encased in a bearing support 195, provided with an end plate 196 held thereto by means of screws 197. The bearing support is securely but detachably affixed to a second housing plate 198 by means of screws 199. A high-speed drive shaft 200, driven by a suitable motor, such as an electric motor or the like (not shown), is provided with worm threads 201 which mesh with a worm gear 202, which is freely mounted upon the drive shaft 182 by means of an assembly designated generally by the numeral 203. The assembly 203 consists of a collar 204 attached to the worm gear 202 by means of screws 205. An annular shoulder 206 provided on the collar 204, has a helical or spur gear ring 207 attached thereto by means of screws 208. The assembly 203 rotatably mounted on the drive shaft 182 by means of a friction bearing 209 is not connected to the drive shaft 182. Assembly 203 is a rapid traverse gear for a high speed movement of the screw 40 which in turn moves the follower arm 34 to a desired location at high speed without affecting any other part of the feed mechanism.

A low-speed worm gear 210 is keyed to the drive shaft 182 by means of a key 211. A drive worm gear 212 is driven by means of an electric or other motor (not shown) and meshes with the worm gear 210 to rotatably drive the shaft 182. An annular spacer 213 separates the gear 210 from the bearing 209. Spaced from the worm gear 210 and keyed to the shaft 182 by means of key 211 is a second gear 214. The gear 214 may be of any type desired, such as helical, spur, or herringbone. A second annular spacer 215 separates the gear 210 from the gear 214.

Also keyed to the shaft 182 by means of the key 211 is a third gear 216 which may be of the helical, spur or herringbone type and is spaced from the gear 214 by means of a spacer 217. The gear 216 is also spaced from the bearing 194 by means of a spacer 218.

Also rotatably mounted within the gear box 183 is a second or driven shaft 219, which is supported by means of a bearing 220 located in housing plate 198 and a second bearing 221 located in housing plate 193. The end of bearing 221 is closed by means of a plate 222 which acts as a thrust plate. The driven shaft 219 is provided with a key-way or elongated slot 223 which extends substantially throughout the length of the driven shaft 219 located within the gear box housing 183. Splined for slidable movement on the driven shaft 219 is a gear 224 provided with a key 225. The key 225 slidably engages within the slot 223 and causes the gear 224 to rotate the shaft 219.

A pair of friction, or other suitable bearings, 226, are slidably provided on the shaft 219 and support a yoke 227, as shown. A pinion or tumbler gear 228 is mounted upon the yoke 227 by means of a pin 229.

The pinion or tumbler gear 228 is in constant engagement with the gear 224 and is adapted to selectively engage with gears 214 and 216. When gear 228 is engaged with gear 214 a speed reduction of 6:1 is provided. When gear 228 is engaged with gear 216 a speed reduction of 3:1 is provided. When a 3:1 or 6:1 ratio is desired, this change of gears makes this available with exact ratios between feed screws 161 and screw 40, and with gear 207 when a rapid traverse drive is desired. Worm 200 is driven by a reversible motor. Worm 212 is driven by an infinitely variable speed hydraulic transmission or motor for precision feed control.

A plate 183' covers the housing 183 and is provided with a suitable opening 183'' having notches therein. A handle 227' is connected to the yoke 227 and extends through the opening 183'' for manual selection of the gears.

The driven shaft 219 extends through the gear box 183, as shown in Fig. 15. Upon the end of this extension of the shaft 219, there is mounted a gear 230, which, as in the case of the above gears, may be of any type desired. A housing 231 is provided about the gear 230 for the purpose of containing a suitable lubricant. The housing 231 is provided with a bearing 232 and end plates 233 adapted to close the housing and act as thrust plate. The housing 231 is mounted upon and securely affixed to a base plate 234 provided on the gear box housing 183. A second housing 235, similar in structure to the housing 231, is also mounted upon the plate 234; and when regarded in the position shown in Fig. 15, is mounted below the plate 234. The housing 235 encases a gear 236 which is driven by the gear 230 and is securely affixed to a drive shaft 237 which carries a universal joint 238 thereon. The universal joint 238, of conventional design, is secured to the shaft 237 as by welding or the like, but may be held by means of a pin or the like. The opposite end of the universal joint 238 is attached to a shaft 242, which telescopically fits into a tubular member 243.

Reference is now made to Fig. 16, which is an enlarged cross sectional view showing the coupling connection between the shaft 242 and the tubular member 243, designated generally by the numeral 244. The coupling 244 consists of elongated slots 246 formed longitudinally of the shaft 242. A pair of keys 247 are affixed to the tubular member 243 by means of screws 248, as shown. The keys 247 are provided with lips 247'. The lips 247' fit into slots 246 provided in the tubular member 243 and extend into the grooves 246, to slide longitudinally within the tubular member 243, but by means of the keys 247 the shaft 242 causes the tubular member 243 to rotate.

A second universal joint, designated generally by the numeral 250, and also of conventional design, is provided on the end of the tubular member 243 opposite the coupling, as shown in Fig. 15. The opposite end of the universal joint 250 is connected to the threaded feed screw 40, as shown. The universal joints and connections of the above-described assembly may be made by welding or the like, or, if preferred, may be provided with pins or threads.

Figure 3:
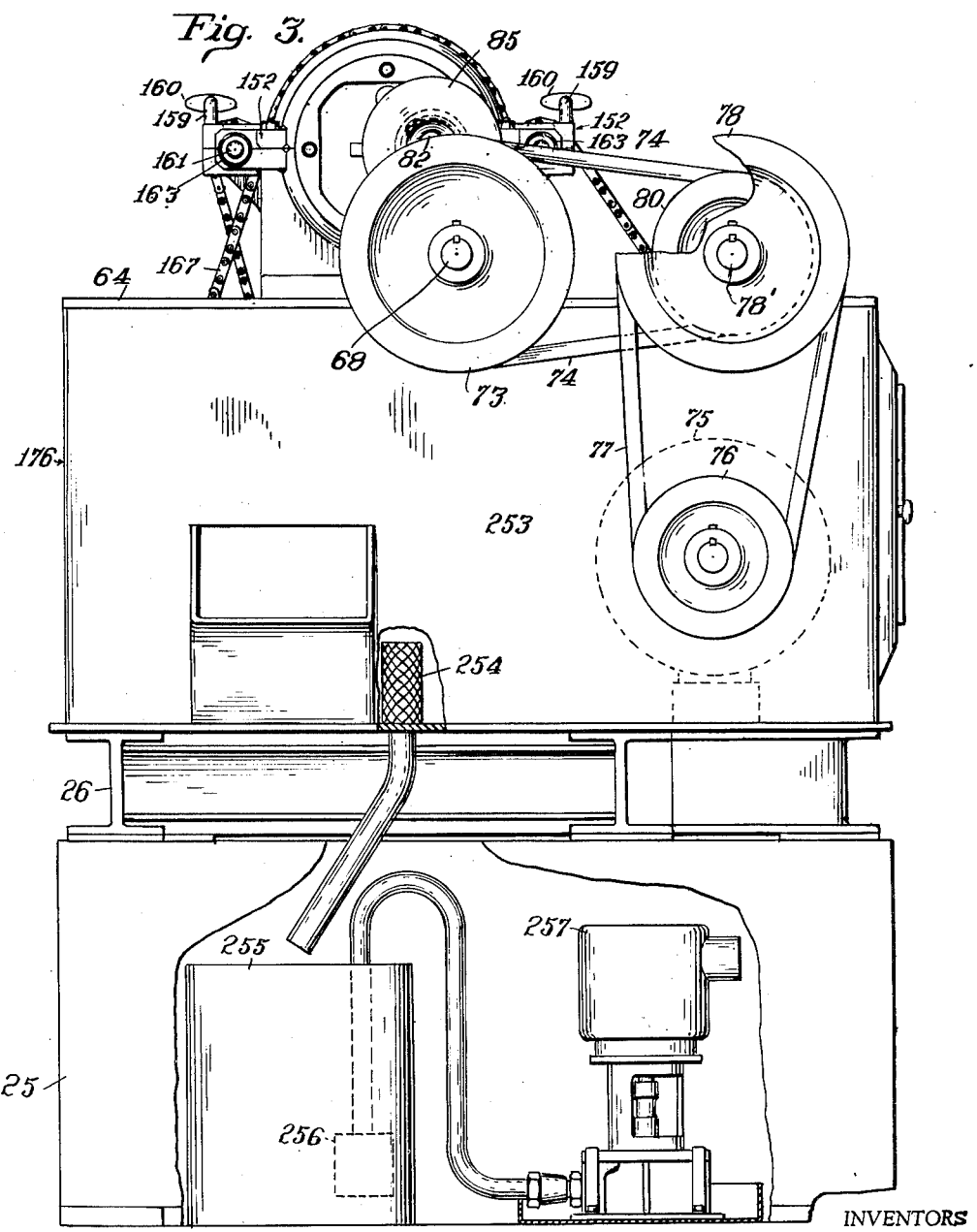
Fig. 3 is an end elevation, looking into the direction of the arrow 3—3 of Fig. 1, with the coolant oil reservoir broken away.

Attention is now directed to Fig. 3, in which there is shown a conventional lubrication or coolant system provided in the sub-base 25 and located beneath the cutter head. This coolant system is provided to remove the cuttings from the cutter 90 and to hold down the temperature of the metal as it is milled or cut or ground. The coolant system comprises, generally, a tank 253 located immediately below the cutter head and into which the cuttings, as well as the coolant, which may be a cutting oil or any acceptable coolant for metal cutting or grinding, drain.

A strainer 254, provided in the bottom of the tank 253, strains or filters out the cuttings in the tank and permits the return of the coolant into a coolant tank 255, where the coolant is again strained by means of a second strainer 256. The coolant is then picked up by means of a pump 257 and is directed in a stream against the work piece and the cutter or grinding wheel by means of a nozzle (not shown). It is to be understood that the coolant system forms no part of this invention and is of conventional design.

When it is desired to convert this machine from a cutting or milling machine to a grinding and finishing machine, it is necessary that a grinding wheel 260 be substituted for the milling tool or cutter 90, as shown in Fig. 18. Inasmuch as extreme accuracy is desired in grinding the finished product, it is necessary to continually "dress" the grinding wheel 260. As the grinding wheel is "dressed" down, suitable arrangement must be made for reducing the effective diameter of the follower wheel 38. The arrangement for accomplishing this, as shown in Fig. 18, is described in detail as follows:

A dressing wheel 261, which may be of any conventional design, is shown supported by a yoke 262, which is mounted upon a plate 263 carried upon the pivoted bearing support plate 58. A threaded member or connecting rod 264 is attached at one end to the yoke 262 and is threaded into a collar 265 rotatably mounted on the plate 263.

A suitable ratchet mechanism for rotation of the collar 265 is provided and is designated generally by the numeral 266. The collar 265 is affixed to a ratchet wheel 268. A pawl 269, pivoted to the plate 263 in any suitable manner, as shown in Fig. 18, is actuated by means of a connecting arm 270, and operates the ratchet wheel 268. The connecting arm 270 is actuated by a solenoid 271, which in turn is energized by means of a suitable electrical control 272. Inasmuch as the electrical control may be of any conventional design, and, in so far as it is adapted for intermittent energization of the solenoid 271, it will be suitable for the purposes intended, no detailed description is felt necessary for the purpose of disclosing this invention.

The control 272, simultaneously with operating solenoid 271, operates a second solenoid 273. The second solenoid 273 in turn actuates a connecting arm 274, connected to a pawl 275 pivotally mounted upon a plate 276 in any suitable manner. The plate 276 is mounted upon the follower arm 34 in any desired manner. The pawl 275 actuates a ratchet wheel 277, which in turn rotates a threaded collar 277' similar to the collar 265. The collar 277' in turn actuates a screw member 278 upon which there is securely mounted a bearing 279.

Rotatably mounted upon the bearing 279 is a wheel 280. The wheel 280, preferably, should be mounted on the bearing 279 by ball or roller bearings, but it is here to be understood that friction bearings may be used, if desired.

The wheel 280 cooperates with a cylindrical drum 281 in which there is provided a central opening 282 in the form of a truncated cone, as shown in Fig. 18. The inner surface of the truncated cone 282 is contacted by the surface of the wheel 280. As the wheel 280 is moved by the threaded screw 278, it is caused to move from side to side of the cylindrical drum 281 with the wheel 280 contacting the inner surface of the cylinder 281 at different points along its inner periphery.

The outer circumference of the cylindrical drum 281 is provided with a follower wheel 283, which is substituted for the conventional follower wheel 38. The cylindrical drum 281 is held in place between plate 276 and a second plate 284 and is permitted to rotate freely between these plates by means of suitable bearings 285, which may be of the friction type or, if desired, may be provided with small balls or the like (not shown).

It will be seen from examining Fig. 18 that such an arrangement will constantly change the effective radius of contact between the wheel 280 and the cylinder 281. The effective radius of the follower wheel is thereby changed as the wheel 280 moves longitudinally. By effective radius is meant the distance from the point on the circumference of wheel 283 touching the template to the center of shaft 278. Regarding the device from right to left as viewed in Fig. 18, when the wheel 280 is moved to the right the effective radius of wheel 283 is decreased, and conversely, when the wheel 280 is moved to the left the effective radius of the wheel 283 is increased.

It will be seen from the foregoing description that as the dressing wheel 261 moves downward with the cutting away of the grinding wheel 260 by means of the timed control 272, the wheel 280 will be moved along the inner periphery of the truncated cone opening 282, and the effective diameter of the follower wheel 283 will be changed in direct ratio with the actual diameter of the grinding wheel 260. Thus, even though the grinding wheel 260 is cut down constantly, the same ratio between the follower wheel 283 and the grinding wheel 260 will always be maintained.

While the operation of this machine has been explained in detail as the various assembled parts have been referred to, a general brief overall summary of the operation of this machine will be given here.

Basically, the fundamental operation of the machine is the provision of a rotating template 31 turning about the same axis as that of the work piece 122, and the provision of a direct reduced ratio, here specifically designated as 6:1, in order to reduce inaccuracies of the template 31. The work piece, first having been inserted into the barrel 105 and the chuck jaws 120 tightened down, is pushed forward between the jaws 120 in the rotating barrel, turning about the same axis as that of the template 31, by means of the pushing mechanism 128 located substantially entirely within the inner walls of the barrel 105. As the work piece 122 is moved laterally of the barrel 105, through the chuck jaws 120, and rotated therewith, together with the template 31, a cutter 90 is addressed to the work piece 122 and mills or cuts the finished blade 123 just as it emerges from the jaws 120 of the barrel.

It is to be here emphasized that the cutting of the work piece from this one point at all times makes for a steadier cut and consequently gives a much higher accuracy of the finished blade. The cutter 90 is caused to pivot about a shaft 60 as it is rotated at a high speed. The pivoting of the cutter 90 is brought about by means of the torque shaft 33 upon which the follower arm 34 is mounted, as well as by means of the connecting arm 53 connected at one end to the torque shaft 33 and at the other end to a connecting member 57 mounted upon the pivoted bearing support plate 58. As has been pointed out above, the whole cutter head assembly is moved with the follower arm 34 in a reduced ratio, here given as an example as 6:1. In order to dampen fluctuations in speeds and vibrations of the cutter 90, a flywheel 85 is provided directly on the shaft 92 of the cutter 90.

Turning now to a detailed description of the form of compensating follower wheel shown in Fig. 20, the numeral 286 designates a follower wheel which is mounted between ball thrust bearings 287. The bearings 287 restrain the follower wheel 286 in its motion axially but allow it to move radially, and to rotate freely therebetween. The follower wheel 286 is restrained from moving radially upon contact with the tapered end 288 of a shaft 288'. The shaft 288' is journaled in sleeve bearings 289 and is restrained from moving axially by means of a collar 290 which is securely attached to shaft 288', as by means of a pin or the like (not shown), and bearings 289. A sleeve 291 which rotatably carries shaft 288' is slidably mounted in a housing 292 and is restrained from rotating by means of a key 293. Threads 291' are provided on the sleeve 291, as shown, and in turn are engaged by a threaded nut 294, which is intermittently rotated by means of a ratchet wheel 295 and a ratchet pawl 296. The ratchet pawl 296 is actuated by a solenoid 297 through a connecting link 298. The housing 292 is adjustable axially by means of a screw 299 for positioning the bearings 287 in relation to the follower wheel 286. Housing 292 is secured to a frame 300 by means of screws 301, and the frame 300 is mounted upon the follower arm 34 of Fig. 1, in any suitable manner. A spring 302 preloads the threads 291' on the sleeve 291 and against the nut 294 to eliminate axial play between the two parts.

A grinding wheel 303 is mounted on the shaft 88, in place of the cutter 90 by means of a shaft 304 or the like, and is rotatably driven in the same manner as the cutter 90. A plunger 305, which has a diamond tip 306, is slidably mounted in a housing 307, and in turn is forced against a template 308, by means of a spring 309. The template 308 controls the radius produced on wheel 303, and the diamond point 306 dresses the grinding wheel 303. The template 308 is mounted on a slide 310 which is threaded internally to receive a threaded shaft 311. The shaft 311 is mounted in a bearing 312 and is intermittently rotated by means of a ratchet wheel 313 and a ratchet pawl 314. Ratchet pawl 314 is actuated by a solenoid 315 and a connecting link 316.

Housing 307, which carries plunger 305, is made integral with the slide 317 which carries suitable slides in a frame 318 and in turn is actuated by a solenoid 319 by means of a connecting link 320. A screw 321 acts as a stop for longitudinal motion of slide 317, and a spring 322 returns the slide and plunger to the position shown in Fig. 20. Frame 318 and the ratchet assembly 313 and 314, as well as the template assembly 308 and the housing 307, are all suitably mounted upon the support plate 59, as shown.

Solenoids 297, 315 and 319 are controlled by a suitable electronic timing device 323 which may be of a conventional design, and any one of several types may be used, any one of which can be purchased on the open market. Therefore, the details are not shown in the drawings.

The operation of the compensating follower wheel shown in Fig. 20 is identical to that shown in Fig. 18 and a detailed explanation of the operation of Fig. 18 is applicable to the compensator and controls of Fig. 20.

It is to be understood that the form of my invention, herewith shown and described, is to be taken as a preferred example of the same, and that various changes in ratios, types of bearings, driving members, motors, and specific arrangement and size of parts may be resorted to without departing from the spirit of this invention or the scope of the subjoined claims.

We claim:

1. A contouring machine comprising a base, means to rotatably mount a template on said base, a blank stock feed barrel carried upon the means rotatably mounting said template, said feed barrel being in axial alignment with said template and rotating therewith, a follower for the template, a torque shaft rotatably mounted on said base, said follower being slidably mounted on said torque shaft, a rotary feed screw, means pivotally mounting said feed screw for rotation about the torque shaft, said feed screw being threadably connected to said follower for longitudinally moving said follower the length of said torque shaft, a rotary cutter, means pivotally mounting said cutter on said base, and linkage means connecting the rotary cutter head to the torque shaft for moving the cutter in a pattern similar to the template.

2. A contouring machine comprising a base, means to rotatably mount a template on said base, a blank stock feed barrel, means rotatably mounting said feed barrel on said base, means for rotating the blank stock feed barrel with the template, a pair of rotary feed screws mounted on said base and extending longitudinally of said feed barrel, means carried by said feed screws for moving a blank stock longitudinally of said feed barrel, a follower for the template, a torque shaft rotatably mounted on said base, said follower being slidably mounted on said torque shaft, a second rotary feed screw, means pivotally mounting said feed screw for rotation about the torque shaft, said last mentioned feed screw being threadably connected to said follower for longitudinally moving said follower the length of said torque shaft, and driving means connected to the feed screws and extending longitudinally of the feed barrel and to the second feed screw pivotally mounted for rotation about the torque shaft, said driving means turning all of the feed screws in timed relation whereby the blank stock is moved longitudinally of the feed barrel as the follower moves longitudinally of the template.

3. A contouring machine comprising a base, means to rotatably mount a template on said base, a blank stock feed barrel, means rotatably mounting said feed barrel on said base, means for rotating the blank stock feed barrel with the template, a pair of rotary feed screws mounted on said base and extending longitudinally of said feed barrel, means carried by said feed screws for moving a blank stock longitudinally of said feed barrel, a follower for the template, a torque shaft rotatably mounted on said base, said follower being slidably mounted on said torque shaft, a second rotary feed screw, means pivotally mounting said feed screw for rotation about the torque shaft, said last mentioned feed screw being threadably connected to said follower for longitudinally moving said follower the length of said torque shaft, driving means connected to the feed screws extending longitudinally of the feed barrel and to the second feed screw pivotally mounted for rotation about the torque shaft, said driving means turning all of the feed screws in timed relation whereby the blank stock is moved longitudinally of the feed barrel as the follower moves longitudinally of the template, a rotary cutter head pivotally mounted on said base, and linkage means connecting the cutter head to the torque shaft for moving the cutter head in a pattern similar to that of the template.

4. A contouring machine comprising a base, a rotary cutter, means pivotally mounting said cutter on said base, means to rotatably mount a template on said base, a blank stock feed barrel, means rotatably mounting said feed barrel on said base and adapted to rotate with said template, blank stock feeding means carried by said feed barrel, a torque shaft rotatably mounted on said base, a follower arm slidably mounted on said torque shaft, a follower wheel rotatably carried upon said follower arm, plates mounted upon said torque shaft adjacent the ends thereof, a threaded drive screw rotatably mounted in said plates, said drive screw being threaded through said follower arm for causing said arm to slide longitudinally of said torque shaft, a universal joint connecting said threaded drive screw to a driving means, and a linkage connecting said torque shaft to said rotary cutter for pivoting said cutter in a pattern similar to said template.

5. A contouring machine comprising a feed barrel having elongated slots extending substantially the length thereof, bearings rotatably mounting said feed barrel on said base, chuck jaws mounted in said feed barrel adapted to slidably receive a blank stock therebetween, blank stock feeding means slidably mounted within said feed barrel, said feeding means extending through said elongated slots, an annular ring surrounding said feed barrel positioned to engage the feeding means extending through the slots in said feed barrel, and rotary feed screws mounting the annular ring upon said base, said feed screws being in threaded engagement with said annular ring for movement thereof longitudinally of said feed barrel.

6. A contouring machine comprising a feed barrel having elongated slots extending substantially the length thereof, bearings rotatably mounting said feed barrel on said base, chuck jaws mounted in said feed barrel adapted to slidably receive a blank stock therebetween, blank stock feeding means slidably mounted within said feed barrel, said feeding means comprising a pair of aligned rods mounted longitudinally within said feed barrel, a cross piece slidably mounted on said rods, a pushing pin pivotally mounted on said cross piece adapted to engage the blank stock and push the same through the chuck jaws as the feed barrel rotates, a transverse arm pivotally mounted on said cross piece, said transverse arm extending through the elongated slots in said feed barrel, an annular ring surrounding said feed barrel positioned to engage the ends of the transverse arm for urging the feeding means longitudinally of said feed barrel, and rotary feed screws mounting the annular ring upon said base, said feed screws being in threaded engagement with said annular ring for movement thereof longitudinally of said feed barrel.

7. A contouring machine comprising a feed barrel having elongated slots extending substantially the length thereof, bearings rotatably mounting said feed barrel on said base, chuck jaws mounted in said feed barrel adapted to slidably receive a blank stock therebetween, blank stock feeding means slidably mounted within said feed barrel, said feeding means comprising a pair of aligned rods mounted longitudinally within said feed barrel, a cross piece slidably mounted on said rods, a pushing pin pivotally mounted on said cross piece adapted to engage the blank stock and push the same through the chuck jaws as the feed barrel rotates, a transverse arm pivotally mounted on said cross piece, said transverse arm extending through the elongated slots in said feed barrel, an annular ring surrounding said feed barrel positioned to engage the ends of the transverse arm for urging the feeding means longitudinally of said feed barrel, rotary feed screws mounting the annular ring upon said base, said feed screws being in threaded engagement with said annular ring for movement thereof longitudinally of said feed barrel, means to rotatably mount a template on said base for rotation with said feed barrel, a torque shaft rotatably mounted on said base, a follower for said template slidably mounted on said torque shaft, a feed screw threadably carried by said follower for longitudinal movement along said torque shaft, and driving means connected to the feed screws in engagement with the annular ring and with the feed screw carried by the follower for driving said screws in timed relation.

8. A contouring machine comprising a base, a rotary cutter, means to pivotally mount said cutter on said base, means to rotatably mount a template on said base, a blank stock feed barrel, means to rotatably mount said feed barrel on said base and adapted to rotate with said template, said barrel having elongated slots therein, blank stock feeding means carried by said feed barrel, a pair of complementary chuck jaws mounted in said feed barrel adapted to slidably receive a blank stock therebetween, said feeding means comprising a pair of aligned rods mounted longitudinally within said feed barrel, a cross piece slidably mounted on said rods, a pushing pin pivotally mounted on said cross piece adapted to engage the blank stock and push the same through the chuck jaws as the feed barrel rotates, a transverse arm pivotally mounted on said cross piece, said transverse arm extending through the elongated slots in said feed barrel, an annular ring surrounding said feed barrel positioned to engage the ends of the transverse arm for urging the feeding mechanism longitudinally of said feed barrel, rotary feed screws mounting the annular ring upon said base, said feed screws being in threaded engagement with said ring for movement thereof longitudinally of said feed barrel, a torque shaft rotatably mounted on said base, a follower arm slidably mounted on said torque shaft, a follower wheel rotatably carried upon said follower arm, plates mounted upon said torque shaft adjacent the ends thereof, a threaded drive screw rotatably mounted in said plates, said drive screw being threaded through said follower arm for causing said arm to slide on said torque shaft, a universal joint connecting said threaded drive screw to a driving means, means for turning the feed screws mounting the annular ring and the drive screw threaded through the follower in timed relation, and linkage connecting said torque shaft to said rotary cutter for pivoting said cutter in a pattern similar to said template.

9. A contouring machine comprising a base, a rotary feed barrel, means for mounting said feed barrel on said base, a chuck adapted to slidably engage a blank stock mounted in said feed barrel, a shaft mounted on said base, a pair of supports pivotally mounted on said shaft, a bearing mounted in one end of said shaft, bearings mounted in the pair of supports, a shaft rotatably mounted in said bearings, a cutter head carried upon one end of said shaft and positioned adjacent the chuck for contact with the blank stock at a point in close proximity to said chuck, a flywheel mounted upon the rotary shaft adjacent the end opposite the end mounting the cutter head, a shaft rotatably mounted in the bearing located in the end of the shaft mounted on the base, means for rotatably driving said last mentioned shaft, and a driving connection between the last mentioned shaft and the shaft carrying the cutter head.

10. A contouring machine comprising a base, a feed barrel, means for rotatably mounting said feed barrel on said base, a chuck adapted to slidably engage a blank stock mounted in said feed barrel, a shaft mounted on said base, a pair of supports pivotally mounted on said shaft, a bearing mounted in one end of said shaft, bearings mounted in the pair of supports, a shaft rotatably mounted in said bearings, a cutter head carried upon one end of said shaft and positioned adjacent the chuck for contact with the blank stock at a point in close proximity to said chuck, a flywheel mounted upon the rotary shaft adjacent the end opposite the end mounting the cutter head, a shaft rotatably mounted in the bearing located in the end of the shaft mounted on the base, means for rotatably driving said last mentioned shaft, a driving connection between the last mentioned shaft and the shaft carrying the cutter head, means for rotatably mounting a template on said base, a follower positioned for contact with said template, means pivotally mounting said follower on said base, and a connecting link between the follower and the pivoted supports for moving the cutter head in a path with the follower.

11. A contouring machine comprising a base, means to rotatably mount a template on said base, a blank stock feed barrel, means rotatably mounting said feed barrel on said base, means for rotating the blank stock feed barrel with the template, a pair of rotary feed screws mounted on said base and extending longitudinally of said feed barrel, means carried by said feed screws for moving a blank stock longitudinally of said feed barrel, a follower for the template, a torque shaft rotatably mounted on said base, said follower being slidably mounted on said torque shaft, a second rotary feed screw, means pivotally mounting said feed screw for rotation about the torque shaft, said last mentioned feed screw being threadably connected to said follower for longitudinal movement thereof the length of said torque shaft, a gear box mounted on said base, a drive shaft rotatably mounted in said gear box, means connecting said shaft to the pair of rotary feed screws, a low speed driving gear mounted in said gear box, a low speed driving gear mounted on said drive shaft, high and low speed gears mounted on said drive shaft, a splined shaft rotatably mounted in said gear box, a universal joint slidably connecting the splined shaft to the feed screw threadably connected to the follower arm, a high speed gear independently rotatably mounted on said drive shaft, a gear slidably mounted on said splined shaft, said last mentioned gear being adapted to selectively engage the high and low speed driven gears mounted on the drive shaft, and the high speed gear independently mounted on the drive shaft.

12. A contouring machine comprising a base, a rotary cutter, means pivotally mounting said cutter on said base, means to rotatably mount a template on said base, a blank stock feed barrel, means rotatably mounting said feed barrel on said base and adapted to rotate with said template, blank stock feeding means carried by said feed barrel, a torque shaft rotatably mounted on said base, a follower arm slidably mounted on said torque shaft, a follower wheel rotatably carried upon said follower arm, plates mounted upon said torque shaft adjacent the ends thereof, a threaded drive screw rotatably mounted in said plates, said drive screw being threaded through said follower arm for causing said arm to slide longitudinally of said torque shaft, a universal joint connecting said threaded drive screw to a driving means, said universal joint comprising a pair of pivoted links, a tubular member affixed to one of said links, a shaft having a keyway therein connected to the other link, said shaft being slidably interfitted into said tubular member, a split collar attached to said tubular shaft, a key attached to said collar having a lip thereon extending into said keyway, and a linkage connecting said torque shaft to said rotary cutter for pivoting said cutter in a pattern similar to said template.

13. A contouring machine comprising a base, means to rotatably mount a template on said base, a blank stock feed barrel, means rotatably mounting said barrel on said base, a rotary cutting wheel, means pivotally mounting said cutting wheel on said base, dressing means for dressing the cutting wheel adapted to be positioned against the cutting wheel, screw actuating means affixed to said dressing means, operating means connected to said screw actuating means, means for mounting the screw actuating means on the means mounting the cutting wheel, a follower arm mounted on said base, a follower wheel provided with an opening extending axially thereof in the form of a cone, a pair of plates mounted on the follower arm, said plates rotatably mounting the follower wheel therebetween, a shaft slidably mounted in said plates and extending axially through the cone in the follower wheel, ratchet means threadably mounted on said shaft for actuation of said shaft in respect to said follower wheel, and a wheel rotatably mounted on said shaft, the outer surface of said wheel slidably and rotatably contacting the inner surface of the cone formed in the follower wheel.

14. A contouring machine comprising a base, means to rotatably mount a template on said base, a blank stock feed barrel, means rotatably mounting said barrel on said base, a rotary cutting wheel, means pivotally mounting said cutting wheel on said base, dressing means for dressing the cutting wheel adapted to be positioned against the cutting wheel, screw actuating means affixed to said dressing means, ratchet operating means connected to said screw actuating means, means for mounting the screw actuating means on the means mounting the cutting wheel, a follower arm mounted on said base, a follower wheel provided with an opening extending axially thereof in the form of a cone, a pair of plates mounted on the follower arm, said plates rotatably mounting the follower wheel therebetween, a shaft slidably mounted in said plates and extending axially through the cone in the follower wheel, ratchet means threadably mounted on said shaft for actuation of said shaft in respect to said follower wheel, a wheel rotatably mounted on said shaft, the outer surface of said wheel slidably and rotatably contacting the inner surface of the cone formed in the follower wheel, solenoid actuated means for operating said ratchets, and electrical operating means for operating the solenoids in timed relation.

15. A contouring machine comprising a base, means to rotatably mount a template on said base, a blank stock feed barrel, means rotatably mounting said barrel on said base, a rotary cutting wheel, means pivotally mounting said cutting wheel on said base, dressing means for dressing the cutting wheel adapted to be positioned against the cutting wheel, screw actuating means affixed to said dressing means, ratchet operating means connected to said screw actuating means, means for mounting the screw actuating means on the means mounting the cutting wheel, a follower arm mounted on said base, a follower wheel provided with an opening extending axially thereof in the form of a cone, means rotatably supporting said follower wheel for freely movable movement transverse to the axis of rotation of said wheel, a rotary shaft extending substantially parallel to the axis of said follower wheel, a cone mounted upon said shaft, said cone extending into the cone opening in the follower wheel, said cone and shaft being mounted for longitudinal movement in relation to the follower wheel, and actuating means connected to the dressing means for governing the longitudinal position of said cone, said means being responsive to the size of the diameter of said cutting wheel.

16. A contouring machine comprising a base, means to rotatably mount a template on said base, a blank stock feed barrel, means rotatably mounting said barrel on said base, a rotary cutting wheel, means pivotally mounting said cutting wheel on said base, dressing means for dressing the cutting wheel adapted to be positioned against the cutting wheel, screw actuating means affixed to said dressing means, ratchet operating means connected to said screw actuating means, means for mounting the screw actuating means on the means mounting the cutting wheel, a follower arm mounted on said base, a follower wheel provided with an opening extending axially thereof in the form of a cone, means rotatably supporting said follower wheel for freely movable movement transverse to the axis of rotation of said wheel, a rotary shaft extending substantially parallel to the axis of said follower wheel, a cone mounted upon said shaft, said cone extending into the cone opening in the follower wheel, said cone and shaft being mounted for longitudinal movement in relation to the follower wheel, threaded means connected to the rotary shaft for longitudinal movement thereof, a ratchet connected to said threaded means for operation thereof, a solenoid actuated means for operating each said ratchet, and electrical operating means for operating the solenoids in timed relation.

17. A contouring machine comprising a base, means to rotatably mount a template on said base, a blank stock feed barrel, means rotatably mounting said barrel on said base, a rotary cutting wheel, means pivotally mounting said cutting wheel on said base, dressing means for dressing the cutting wheel adapted to be positioned against the cutting wheel, said dressing means including a spring loaded shaft having a cutting point thereon, a template positioned against said shaft for action thereof, screw actuating means affixed to said template, ratchet operating means connected to said screw actuating means, means for mounting the screw actuating means on the means mounting the cutting wheel, a follower arm mounted on said base, a follower wheel provided with an opening extending axially thereof in the form of a cone, means rotatably supporting said follower wheel for freely movable movement transverse to the axis of rotation of said wheel, a rotary shaft extending substantially parallel to the axis of said follower wheel, a cone mounted upon said shaft, said cone extending into the cone opening in the follower wheel, said cone and shaft being mounted for longitudinal movement in relation to the follower wheel, threaded means connected to the rotary shaft for longitudinal movement thereof, a ratchet connected to said threaded means for operation thereof, a solenoid actuated means for operating each said ratchet, and electrical operating means for operating the solenoids in timed relation.

ARTHUR C. NORSWORTHY.
GEORGE L. MEIDINGER.
WILLIAM B. MAYO.
M. B. SEYFFERT.

References Cited in the file of this patent

UNITED STATES PATENTS

| Number | Name | Date |
|---|---|---|
| 344,777 | Griswold | June 29, 1886 |
| 554,797 | Roberts | Feb. 18, 1896 |
| 782,241 | Hanson | Feb. 14, 1905 |
| 1,349,250 | Albee | Aug. 10, 1920 |
| 1,815,574 | Miller | July 21, 1931 |
| 1,886,274 | Kylberg | Nov. 1, 1932 |
| 1,895,334 | Marsillius | Jan. 24, 1933 |
| 2,091,456 | Rybick | Aug. 31, 1937 |
| 2,334,938 | Lang | Nov. 23, 1943 |
| 2,364,322 | Schultz et al. | Dec. 5, 1944 |
| 2,421,548 | Davies | June 3, 1947 |
| 2,579,337 | Reaser et al. | Dec. 18, 1951 |

FOREIGN PATENTS

| Number | Country | Date |
|---|---|---|
| 161,116 | Germany | Nov. 28, 1902 |